United States Patent
Rodman et al.

(10) Patent No.: US 7,940,923 B2
(45) Date of Patent: *May 10, 2011

(54) SPEAKERPHONE WITH A NOVEL LOUDSPEAKER PLACEMENT

(75) Inventors: Jeffrey Rodman, San Francisco, CA (US); Greg Goldfarb, Burlingame, CA (US); Peter Chu, Lexington, MA (US)

(73) Assignee: Polycom, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/551,885

(22) Filed: Sep. 1, 2009

(65) Prior Publication Data

US 2009/0324001 A1   Dec. 31, 2009

Related U.S. Application Data

(63) Continuation of application No. 11/136,137, filed on May 24, 2005, now Pat. No. 7,646,862.

(51) Int. Cl.
*H04M 1/00* (2006.01)
*H04M 9/00* (2006.01)

(52) U.S. Cl. ................ 379/420.01; 379/420.02

(58) Field of Classification Search ............ 381/26, 381/87, 91, 92, 122, 304, 300, 301, 308, 381/332, 333, 336, 111, 386–388; 379/202.01, 379/204.01, 420.01–420.04, 433.02, 432, 379/434; 370/260, 261; 348/14.08
See application file for complete search history.

(56) References Cited

U.S. PATENT DOCUMENTS

| 6,275,580 B1 * | 8/2001 | Faraci et al. ............. 379/388.01 |
| 2005/0231586 A1 * | 10/2005 | Rodman et al. ............ 348/14.07 |

* cited by examiner

*Primary Examiner* — Tuan D Nguyen
(74) *Attorney, Agent, or Firm* — Wong, Cabello, Lutsch, Rutherford & Brucculeri, LLP

(57) ABSTRACT

A new speakerphone wherein a loudspeaker is oriented to face the listeners of an audio conference is disclosed. New speakerphones which have a bass loudspeaker and at least one tweeter loudspeaker wherein the tweeter loudspeaker is oriented towards listeners of an audio conference are also disclosed.

13 Claims, 8 Drawing Sheets

SPEAKERPHONE WITH A NOVEL LOUDSPEAKER PLACEMENT

CROSS-REFERENCE TO RELATED APPLICATIONS

This application is a continuation of U.S. patent application Ser. No. 11/136,137, filed May 24, 2005, now U.S. Pat. No. 7,646,862, which is incorporated by reference herein. U.S. patent application Ser. No. 11/136,137 is related to U.S. patent application Ser. No. 11/108,015 assigned to the same assignee, titled "Integrated Desktop Videoconferencing Phone," by Timothy Root, Tony Duys, and Dan Phelps, filed on Apr. 15, 2005, now U.S. Pat. No. 7,593,031, which is incorporated by reference herein and to patent application, Ser. No. 10/412,755, filed on Apr. 11, 2003, titled "Portable Videoconference System," which is also incorporated by reference herein.

BACKGROUND OF THE INVENTION

1. Field of the Invention

This invention relates to a speakerphone, more specifically to novel way of placing loudspeakers in a speakerphone to improve the intelligibility of speech of conference talker.

2. Description of the Related Art

Teleconferencing has long been an essential tool for communication in business, government and educational institutions. There are many types of teleconferencing equipment based on many characterizations. One type of teleconferencing unit is a video conference unit 100 as shown in FIG. 1, which transmits real-time video images as well as real-time audio signals. A video conferencing unit 100 typically comprises a video processing component and an audio processing component. The video processing component may include a camera 102 to pick up live images of conference participants and a video display 130 for showing real-time video images of conference participants or images of documents. The audio portion of the video conferencing unit 100 typically includes one or more microphones 145 and 155 connected to a processor 110 through wires 156 and 157 to pick up voice signals of conference participants, and loudspeakers 122 and 124 to reproduce voices of the participants at the far end. The processor 110 is connected to the far side of the conference through a cable 150. The processor 110 may control the operation of the video conference unit 100 and perform any the data processing necessary during operation.

Another type of teleconference unit is an audio conference unit, which is typically a speakerphone or a simple telephone that includes at least a loudspeaker and a microphone. FIGS. 2a-2c illustrate a few examples of speakerphones. A speakerphone can be viewed as essentially a video conference unit without the video capability and the video-related hardware and network supporting infrastructure. To make an audio-only conference call using a speakerphone is much simpler and easier than using a videoconference unit. A speakerphone is typically much cheaper than a videoconference unit. An analog telephone is typically the cheapest, simplest and easiest to use teleconference unit.

FIG. 2a shows a typical speakerphone 200, for example, a Polycom VTX-1000 speakerphone which is commercially available from the assignee of the current patent application. The speakerphone 200 has several microphones 242, 244 and 246, a loudspeaker 222 and a control module 260. The control module 260 has a controller (not shown) that is coupled to the loudspeakers, microphones and network interface (not shown). The control module also has two keyboards 270 and 272 and a display screen 262. A cable 250 coupled to the network interface (not shown) provides power and network connections. FIGS. 2b and 2c show a slightly different speakerphone 210, which has similar components including microphones 212, 214 and 216, loudspeaker 222 and a control module 220. In speakerphone 210, the components are arranged in a slightly different physical configuration compared to the speakerphone 200. FIG. 2b shows a top view and FIG. 2c shows a side view of the speakerphone 210.

The low cost of a speakerphone is often associated with the low audio quality of the speakerphone. It is common that when several people participate in a conference call, it may be difficult to understand what a talker on the far end is talking about even if the volume of the speakerphone is turned on high. The conference call participants at the near end may have to sit very close to the speakerphone to be able to hear and understand the far end talker. This makes the participants to crowd over the speakerphone, even though there is plenty of space in the conference room. This makes the conference very uncomfortable and inconvenient.

The problem associated with the difficulty of understanding the talkers at a far end site when there are several people on both conference sites does not appear to be solved by turning up the volume on the speakerphone. Such problem does not appear to be present in many video conference units, which are substantially more expensive.

It is desirable to have a method and a speakerphone with improved sound quality without incurring the substantial cost of a videoconference unit.

BRIEF SUMMARY OF THE INVENTION

In one embodiment of the current invention, the orientation of loudspeakers in a speakerphone is changed from facing upward vertically to facing conference participants (listeners) horizontally. This way, the sound reproduced by the loudspeakers can reach the conference participants directly.

In some other embodiments of the current invention, multiple loudspeakers are installed in a speakerphone, wherein a bass loudspeaker is used to reproduce low frequency sound, and at least one small tweeter loudspeaker is used to reproduce high frequency sound. The tweeter loudspeaker is oriented towards the listeners in an audio conference, rather than the usual orientation which is towards the ceiling of the conference room. Multiple tweeter loudspeakers may be installed such that there are direct sound waves coming from a tweeter loudspeaker towards each listener sitting around the conference table. The small size of a tweeter loudspeaker makes it easy to orient to its optimum direction individually without affecting the overall size or profile of the speakerphone. The low cost of a tweeter loudspeaker does not increase the cost of the overall speakerphone.

BRIEF DESCRIPTION OF THE SEVERAL VIEWS OF THE DRAWINGS

A better understanding of the invention can be had when the following detailed description of the preferred embodiments is considered in conjunction with the following drawings, in which.

DETAILED DESCRIPTION OF THE INVENTION

Figure 1:
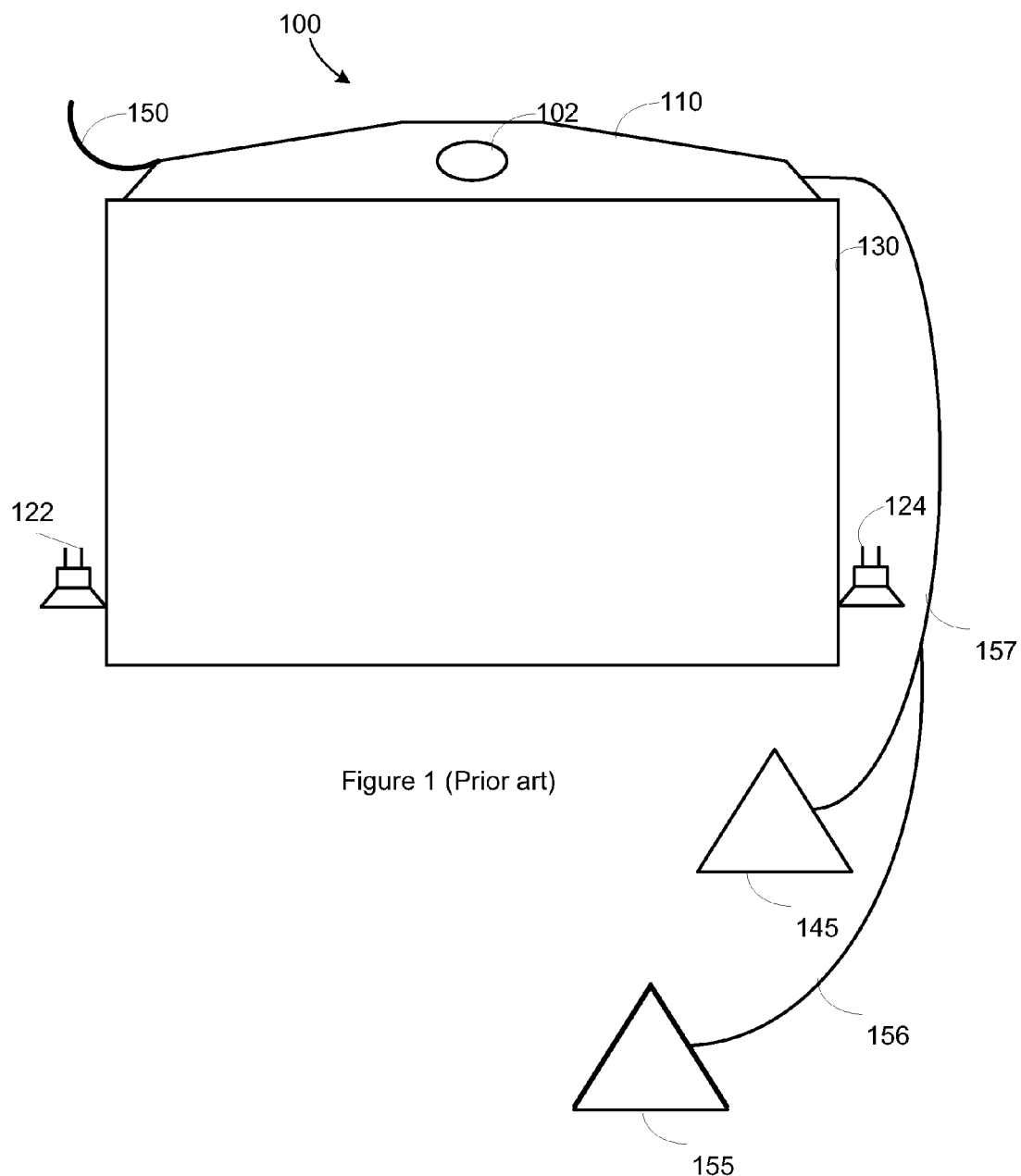
FIG. 1 depicts a typical video conferencing unit in prior art.

During the investigation of improving the sound quality of speakerphones, the inventors of the current invention discovered that the material qualities of microphones or loudspeakers are not the major contributors to the low sound quality of speakerphones. When comparing the loudspeakers in a typical video conference unit and the loudspeaker in a high quality speakerphone, the quality of the loudspeakers themselves is comparable. Still, it is very difficult to understand the speech of far end talker using a speakerphone, if the listener is only slightly away from the speakerphone, e.g. sitting at a large conference table. It is also noticed that if the listener is standing and leaning right above the loudspeaker of the speakerphone, the intelligibility increases substantially. It is discovered that the intelligibility differences between a typical speakerphone and a typical video conference unit is more related to the placement and orientation of the loudspeakers in respective units. As shown in FIG. 1, the loudspeakers 122 and 124 of a video conference system are typically installed facing the listeners in a conference room. On the other hand, as illustrated in FIGS. 3a and 3b, the loudspeaker 310 in a speakerphone is typically oriented upward, facing the ceiling of the conference room.

Figure 3A:
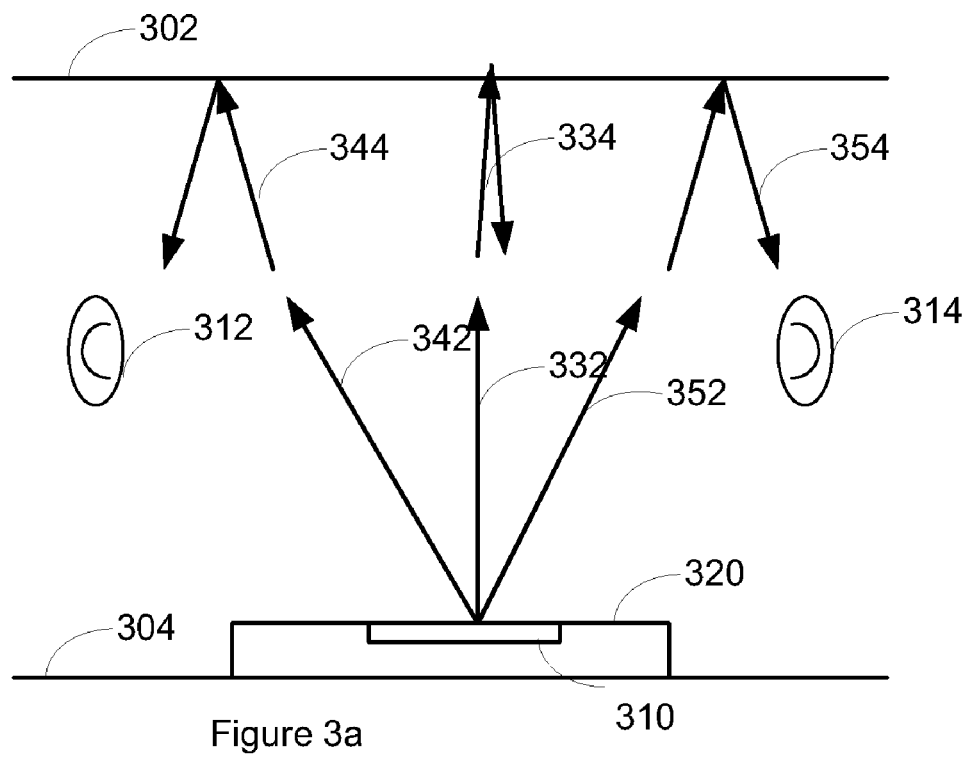
FIGS. 3a and 3b illustrate the traveling patterns of sound waves of high frequencies and of low frequencies respectively.
Figure 3B:
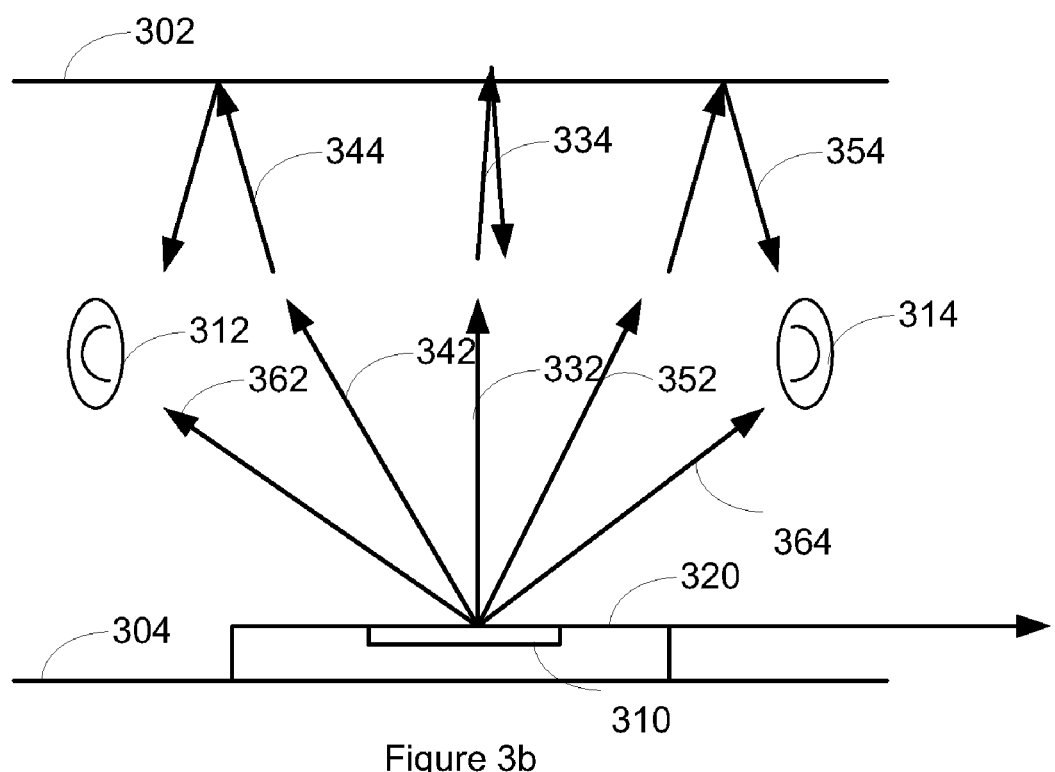

As shown in FIGS. 3a and 3b, a loudspeaker 310 has a center line 342, which is a line perpendicular to the surface of the loudspeaker. A center line direction is the direction that is perpendicular to the surface of the loudspeaker and away from the center of the loudspeaker. A center line angle is the angle between the center line and the horizontal direction. In speakerphones, the center line angles of the loudspeakers are about 90 degrees, i.e. in a vertically upward direction, while in many video conference units, the center line angles are about 0 degree, i.e. in a horizontal direction. In most video conference units, e.g. in video conference unit 100 shown in FIG. 1, the loudspeakers (e.g. 122 and 124) are the loudspeakers in a TV monitor 130, which is external to the video conference module 110. The video conference module 110 is the box that contains the network connection, the camera, the microphones and the data processing component.

FIG. 3a illustrates the sound wave traveling pattern for high frequency sound wave, e.g. sound with frequencies above 1000 Hz. A speakerphone 320 is placed on a conference table 304. The loudspeaker 310 in the speakerphone 320 is facing upward towards the ceiling 302 of the conference room. As for the high frequency waves 342, 332 and 352, the sound wave field is narrow. They are traveling upward towards the ceiling. Some of the sound waves 344 and 354 are reflected by the ceiling 302, and then reach the listeners 312 and 314. The listeners 312 and 314 do not actually hear the sound coming from the loudspeaker 310 directly. On the other hand, FIG. 3b illustrates the sound wave traveling pattern for low frequency sound waves, e.g. sound with frequencies below 1000 Hz. The low frequency sound waves are typically less localized. So even coming from the same loudspeaker 310, some of the sound waves 362 and 364 can reach the listeners 312 and 314 directly, besides the indirect sound waves 344, 354 etc. Those low frequency sound waves can carry much of the energy coming out of the loudspeaker 310 that can reach the listeners. When increasing the volume of the loudspeakers 310, the low frequency amplitude is increased accordingly. But the high frequency portion of the sound waves does not increase proportionally because the majority of the increased energy in the high frequency waves is dissipated in the conference room before reaching the listeners. This makes the audio spectrum heard by the listeners more heavily weighted in the low frequency spectrum. It is known that most of the audio information is carried by high frequency portion of the audio spectrum. Missing the high frequency portion of the audio spectrum makes the speech less intelligible. Increasing the loudspeaker volume only makes the sound heard by the listeners more over-weighted at the low frequency spectrum. This is a reason why increasing the volume of the loudspeaker in a speakerphone does not increase necessarily the intelligibility of the talkers from the far end of the conference call.

For a typical round loudspeaker, the angular coverage is about 60 degrees or 90 degrees for larger ones. As illustrated in FIG. 3a, the angle between lines 342 and 352 is typically less than 60 degree for full bandwidth. For low frequency sound, the angular coverage may be greater, but that sound is not very intelligible due to the excess loss of high frequency components. Therefore, measuring from horizontal direction, a listener needs to be at or above at least 60 (or 45 for larger ones) degree to be within the full spectrum sound field of the loudspeaker. As shown in FIG. 3a, the listener's ears need to be above the lines 352 and 342, which are about 60 degrees above horizon.

But in a typical conference setting, listeners' ears are typically below such level. In a typical audio conference, participants are usually sitting around a conference table. The ear level of participants for an average person is about 18" above the conference table level which is at about 29" above ground. That is for an average person, his ears are about 47" above ground when he is sitting. For a typical conference table, 48"×120", the angle between the ear level to horizontal direction centered at the loudspeaker of a speakerphone placed at the center of the conference table is about 17 degree (at the far end of the conference table, arctan(18/60)=17 degrees) to about 37 degree (at the center of conference table, arctan(18/24)=37 degrees). So for an average person sitting at the center of the conference table near the speakerphone, he is still not within the full-spectrum sound field of the loudspeaker.

If a person is standing, the ear level is about 36" above the table, or 65" above ground. The corresponding angles are about 31 and 56 degrees. So if the person is standing near the center of the conference table, he is within the full-spectrum sound field and can have good intelligibility. If he is standing a little further away from the center, he may need to lean over the table to get the same intelligibility.

To correct the problems, according to the embodiments of the current invention, the loudspeaker orientation in a speakerphone is changed. Rather than facing the ceiling, the loudspeakers in speakerphones according to some embodiments of current invention are oriented towards the listeners in a conference room. The loudspeakers in a speakerphone are facing near horizontal, i.e. the center line angle is near 0 degree, rather than vertically upwards, i.e. the center line angle is at 90 degrees.

Figure 2A:
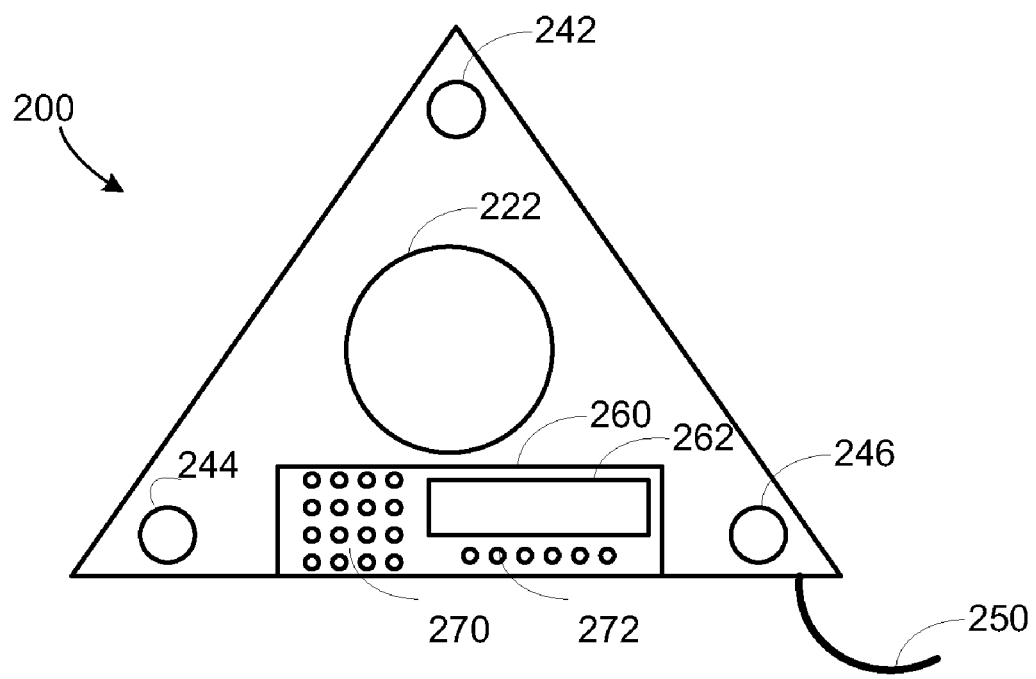
FIGS. 2a-2c depict speakerphones in prior art.
Figure 2B:
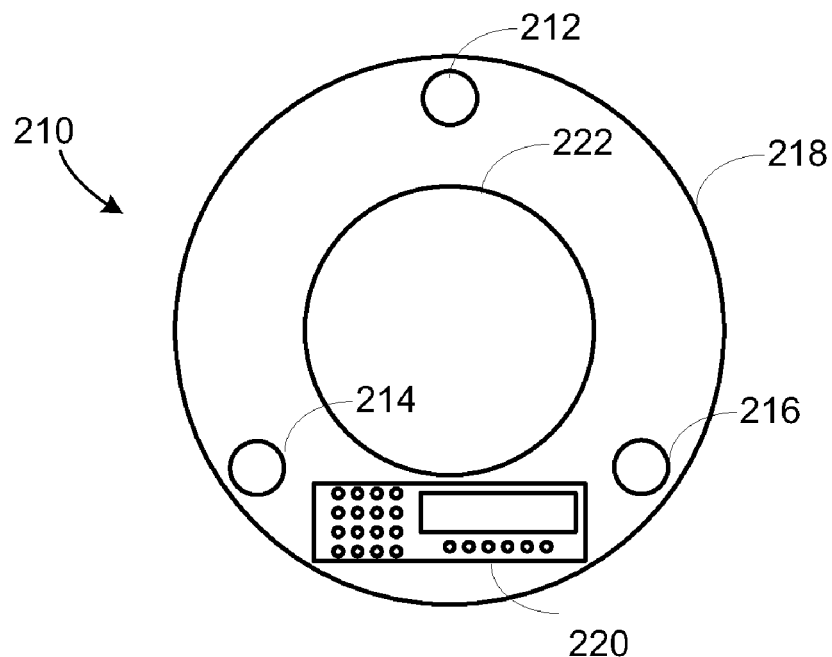
Figure 2C:
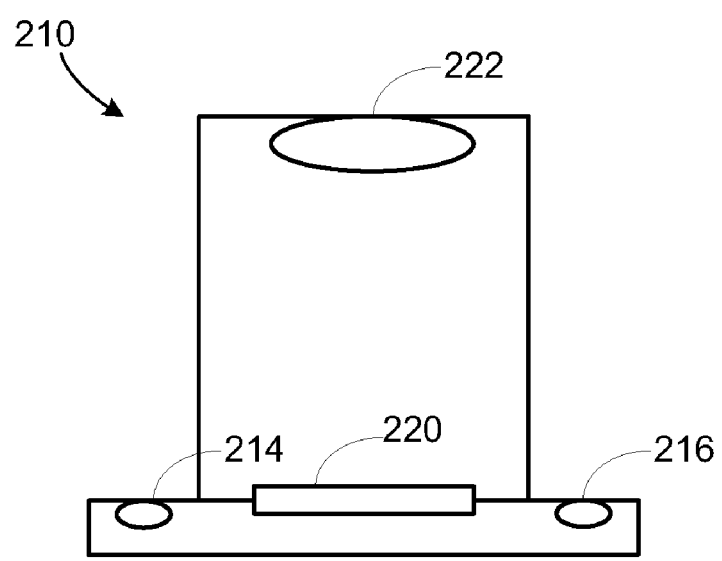
Figure 4A:
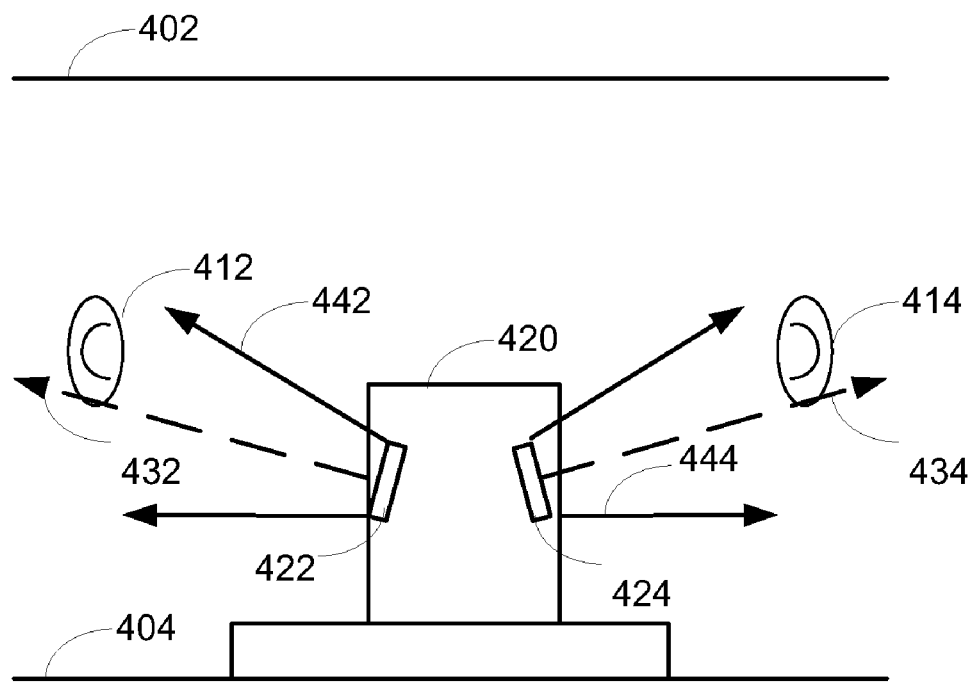
FIGS. 4a-4d depict one embodiment of the current invention.
Figure 4B:
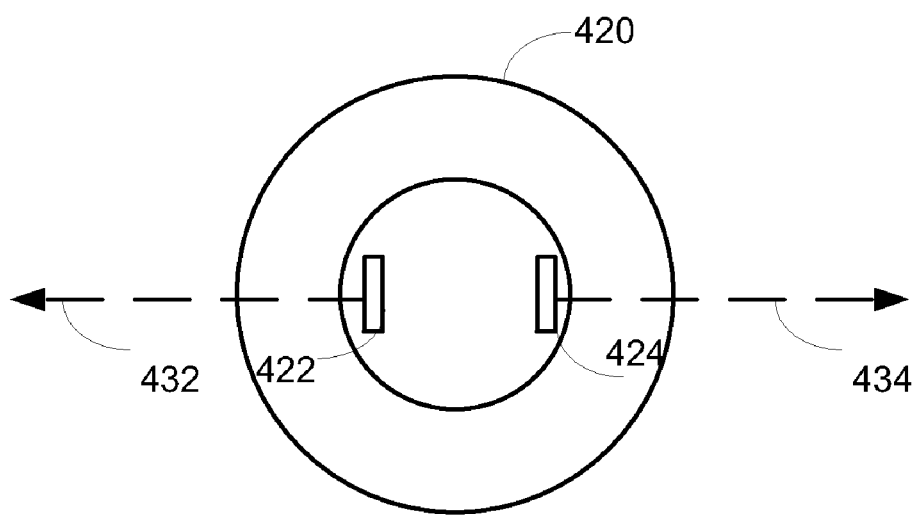

FIGS. 4a-4d illustrate one embodiment of the current invention. FIG. 4a is a side view and FIG. 4b is a top view. The speakerphone 420 is similar to the speakerphone 210 depicted in FIGS. 2b and 2c, except that loudspeakers 422 and 424 replace the single loudspeaker 222 as in speakerphone 210. Similar to the speakerphone 210, almost all components, including microphones (not shown), loudspeakers 422 and 424, a processor and a network interface (not shown) are contained within the speakerphone 210. The speakerphone is a self-contained device. The loudspeaker 422 is facing listener 412 and the loudspeaker 424 is facing listener 414. The center line 434 (432) of the loudspeaker 424 (422) is at about 30 degrees from horizontal, such that the sound angular coverage is from horizontal (0 degree) to 60 degrees above horizontal for a loudspeaker with 60 degree angular coverage. To provide better room coverage, loudspeakers 424 and 422 are directed to different directions in the horizontal plane. More specifically, the center lines 432 and 434 are not in parallel, or the angle between the two is greater than 0 degree. In this example, the angle between the two center lines 434 and 432 is about 180 degrees. Listeners are within the full spectrum coverage, i.e. most of the sound waves from the loudspeakers go to the listeners directly. The sound waves the listeners hear are more balanced and complete, rather than over-weighted at the low frequencies. In this embodiment, the loudspeakers 422 and 424 are identical. They are full spectrum loudspeakers, i.e. each loudspeaker reproduces both low frequency and high frequency audio. Depending on the property of the loudspeakers used in a speakerphone, the center line angle is typically between 0 degree (i.e. horizontal) and 45 degrees (i.e. half way between vertical and horizontal). When the center line angle is set at 45 degree, if the loudspeaker has a 90 degree angular coverage, then the entire range of 0 degree to 90 degrees is covered by the loudspeaker.

Figure 4C:
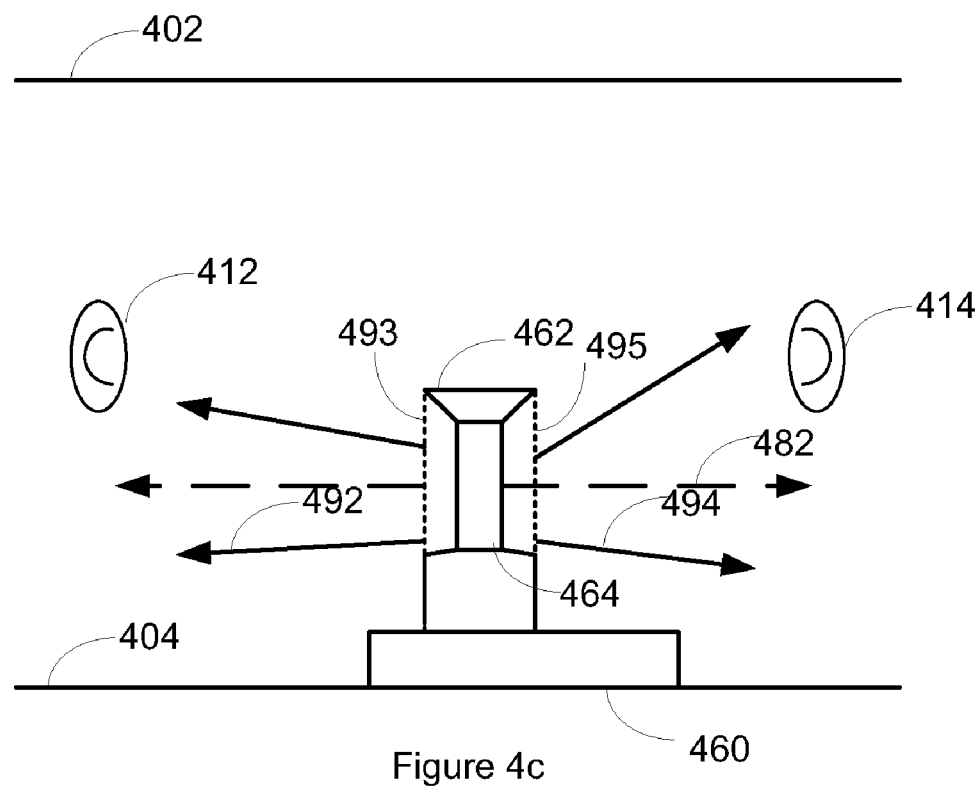
Figure 4D:
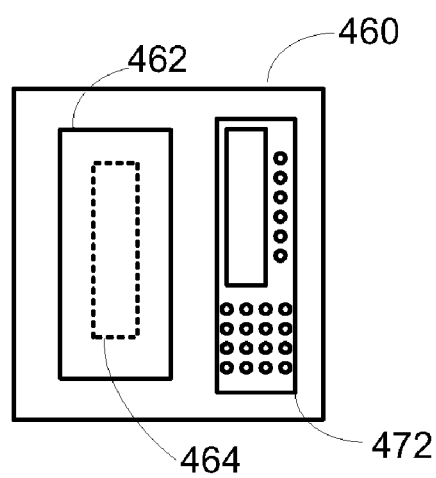

FIGS. 4c and 4d illustrate a simplified version of the embodiment shown in FIGS. 4a and 4b. In this embodiment, there is only one loudspeaker 464 installed in a raised a loudspeaker tower 462 in a speakerphone 460. The loudspeaker 464 is facing the listener 414, in a horizontal direction, i.e. the center line angle at 0 degree. The forward sound 494 produced by loudspeaker 464 can reach the listener 414 directly. The optional front sound duct and opening 495 helps in guiding the sound waves. In one implementation, the center of the loudspeaker is about 4" above conference table. So the sound field is from horizon as limited by the conference table to about 30 degrees above horizontal. Using the same example as discussed above, the ear level for a person sitting at the center of the conference table is arctan((18−4)/24)=30 degree. The angle of the ear level for persons sitting further away from the center is less than 30 degrees. So even using a loudspeaker with only 60 degree angular coverage, there is sufficient vertical angular coverage.

The listener 412 who is sitting facing the back of the speakerphone 460 may not have as good quality sound as the listener 414 who is sitting in the front of the speakerphone 460, but listener 412 can still get some direct sound waves from the loudspeaker 464. The optional back sound duct 493 may help directing the sound. The sound quality in the back of a loudspeaker is still better than that of the sound that is 90 degrees to the loudspeaker, which is the sound heard by listeners using prior art speakerphones. The speakerphone 460 may also have a dial-pad 472. Due to the simplicity, this speakerphone is suitable for use in a small conference where people sit either in front of the speakerphone or facing its back. If a loudspeaker with broad angular coverage is used in such a speakerphone, then horizontal angular coverage may be further improved.

Figure 5A:
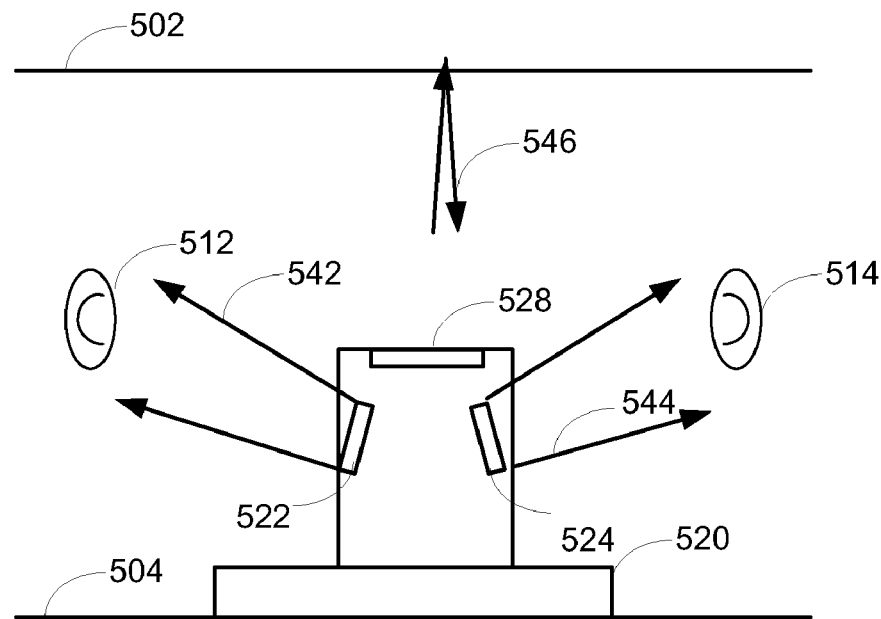
FIGS. 5a, 5b, 6a and 6b depict several other embodiments of the current invention.
Figure 5B:
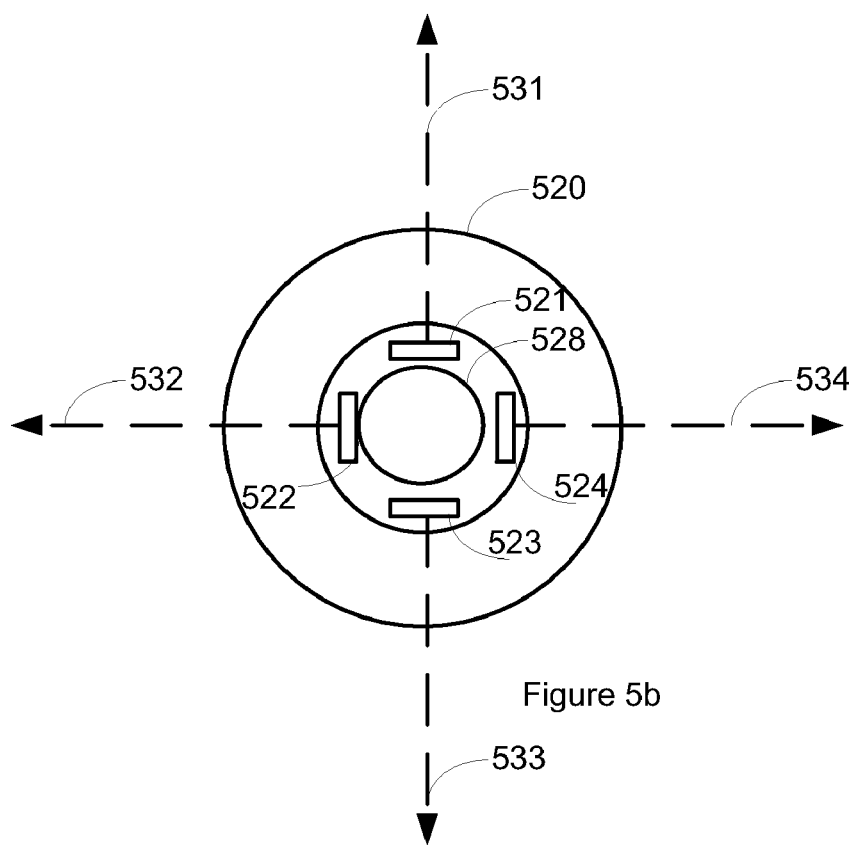

To further improve the sound quality and configuration flexibility, FIGS. 5a, 5b, 6a and 6b illustrate some alternative embodiments of the current invention where separate tweeter and bass loudspeakers are used. The embodiment shown in FIGS. 5a and 5b is very similar to the one shown in FIGS. 4a and 4b except for the addition of a bass loudspeaker 528. The addition of the bass loudspeaker 528 makes it possible to replace the full spectrum loudspeakers 422 and 424 as in speakerphone 420 with tweeter loudspeakers 521, 522, 523 and 524 as in speakerphone 520. The tweeter loudspeakers 521-524 are much smaller than the full spectrum loudspeakers 422 and 424. They are typically much cheaper also. The smaller sized make the tweeter loudspeakers 521-524 much easier to orient towards the listeners 512 and 514 etc. Each tweeter loudspeaker 521-524 has a center line 531-534 respectively. If the tweeter loudspeakers 521-524 have the same audio properties, then it is desirable to place them evenly within the speakerphone, i.e. have the angles between any two neighboring center lines be substantially the same. In this example, the angles between any two neighboring center lines are all 90 degrees, e.g. angles between lines 531 and 532, 531 and 534, 532 and 533, and 533 and 534 are all 90 degrees. It is also possible to add more of these tweeter loudspeakers to cover more spaces around the conference table if necessary. Obviously, if different numbers of loudspeakers are used in a speakerphone, then the angles between the neighboring loudspeakers are different. If the audio properties (e.g. angular coverage) of the loudspeakers used are different, then the angles between the neighboring loudspeakers are also different. The separation of the reproduction of bass frequencies and tweeter frequencies with different loudspeakers improves the sound quality of the speakerphone. The direct sound waves, more importantly the direct high frequency sound waves towards the listener, also increase the intelligibility greatly with minimum cost. The center line angle of the bass loudspeaker 528 is at about 90 degrees, while those of the tweeter loudspeakers 521-524 are between 0-45 degrees, typically at about 15 degrees.

Figure 6A:
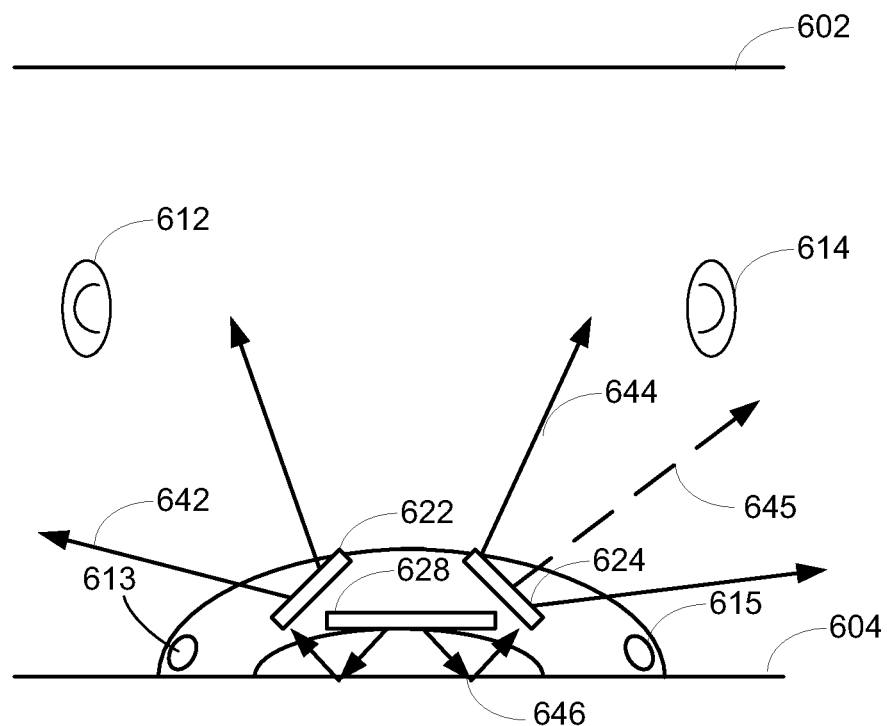
Figure 6B:
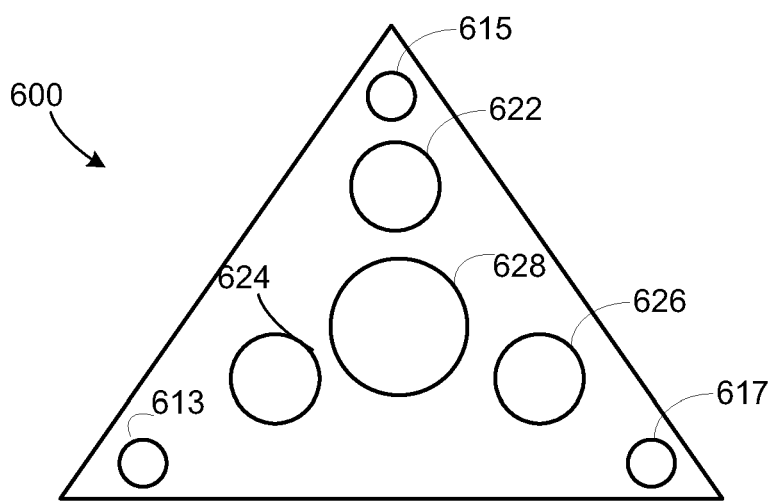

Due to the small size of the tweeter loudspeakers, they can be oriented at any directions necessary, without increasing the overall profile (height) of a speakerphone, such as in the embodiment shown in FIGS. 6a and 6b. The speakerphone 600 is about the same height as the one shown in FIG. 2a. The speakerphone 600 in the example shown in FIGS. 6a and 6b is placed on a conference table 604 and facing upward towards the ceiling 602. It has one bass loudspeaker 628, several small tweeter loudspeakers 622 and 624 and several microphones 613 and 615 (loudspeaker 626 and microphone 617 are not shown in FIG. 6a but are shown in FIG. 6b). The bass loudspeaker 628 is facing downward, i.e. with a center line angle at −90 degrees. The low frequency sound 646 is reflected by the conference table 604 and then radiates towards the listeners 612 and 614. The high frequency sound waves 642 and 644 generated by the tweeter loudspeakers 622, 624 and 626 etc. traveling directly towards the listeners 612 and 614. The center line angles of the tweeter loudspeakers, e.g. center line 645, are at about 30 degrees for the embodiment as shown in FIG. 6a. The low frequency waves 646 are not directional, so the orientation of the bass loudspeaker 628 is not important. It can be place anywhere with any orientation, i.e. from −90 degree to +90 degrees, in the speakerphone 600 that is convenient for other reasons. The tweeter loudspeakers 622, 624 and 626 may be placed at the three corners of the speakerphone, facing the listeners.

In the above embodiments, the loudspeaker orientations are fixed, but they do not have to be. If desired, the loudspeaker orientations can be adjusted based on the conference situation. For example, the tweeter loudspeakers 622, 624 and 626 may be adjusted during use in a conference call to make their orientations optimum for the particular conference call. Some of them may be directed more upward to taller people or who are standing, others may stay at their original positions, directing to people sitting at the conference table.

As discussed above, the current invention discloses a reason for poor sound quality, i.e. poor intelligibility, of a speakerphone. Utilizing this finding, the embodiments of the current invention change the structures of typical speakerphones slightly but improving the sound quality greatly. The better orientations of the loudspeakers in speakerphones according to the embodiments of the current invention greatly improve the intelligibility of talkers of the far end of a conference call. Most embodiments of the current invention can also save energies because less sound energy is wasted due to room dissipation. The separation of audio spectrum reproduction also further improves the sound quality and the flexibility of speakerphone construction. Furthermore, unlike a typical video conference unit which is place at one end of a conference room, where the people can only sit in front of it, in an audio conference call, a speakerphone is placed at the center of the conference room on a conference table, where people sit around the speakerphone. Using a speakerphone, people sitting around the table can all hear the speech of talkers at the far end of the conference call.

While illustrative embodiments of the invention have been illustrated and described, it will be appreciated that various changes can be made therein without departing from the spirit and scope of the invention.

We claim:

1. A speakerphone for placement on a horizontal surface comprising:
 a microphone;
 a plurality of loudspeakers, each loudspeaker facing upwardly and each loudspeaker having a center line angle, wherein the center line angle is at most 45 degrees above horizontal and the angle between any two neighboring loudspeaker center lines is greater than 0 degrees;
 an interface through which the speakerphone is connected with another teleconference unit;
 a process unit coupled to the microphone, the loudspeakers and the interface; and
 a housing containing the microphone, the loudspeakers, the interface and the process unit.

2. The speakerphone of claim 1, wherein at least one loudspeaker center line angle is adjustable up to at most 45 degrees above horizontal.

3. The speakerphone of claim 1, further comprising:
 a bass loudspeaker coupled to the process unit, wherein the bass loudspeaker has a center line angle, and
 wherein the plurality of loudspeakers are tweeter loudspeakers.

4. The speakerphone of claim 3, wherein the center line angle of the bass loudspeaker is between −90 degrees and 90 degrees from horizontal.

5. The speakerphone of claim 4, wherein the center line angle of the bass loudspeaker is −90 degrees from horizontal.

6. The speakerphone of claim 1, further comprising:
 wherein the angle between any two neighboring loudspeakers' center lines is substantially the same as the angle between any other two neighboring loudspeakers' center lines.

7. The speakerphone of claim 6, further comprising:
 one or more additional microphones coupled to the process unit.

8. A speakerphone comprising:
 a microphone;
 a loudspeaker having a center line angle, wherein the center line angle is at most 45 degrees above horizontal;
 an interface through which the speakerphone is connected with another teleconference unit;
 a process unit coupled to the microphone, the loudspeaker and the interface; and
 a housing containing the microphone, the loudspeaker, the interface and the process unit,
 wherein the housing has at least two openings, one opening in front of the loudspeaker and one at the back of the loudspeaker.

9. A speakerphone operable to be placed on a conference table in a conference room, wherein chairs are placed around all sides of the conference table to accommodate seated conference participants, the speakerphone comprising:
 a microphone;
 a loudspeaker facing upwardly and having a center line angle, wherein the center line angle is at most 45 degrees above the conference table and the loudspeaker is oriented to deliver high frequency sound directly to a seated conference participant;
 an interface through which the speakerphone is connected with another teleconference unit;
 a process unit coupled to the microphone, the loudspeaker and the interface; and
 a housing containing the microphone, the loudspeaker, the interface and the process unit.

10. The speakerphone of claim 9, further comprising:
 at least one additional loudspeaker having a center line angle and contained in the housing coupled to the process unit, wherein each of the at least one additional loudspeakers is oriented to deliver high frequency sound directly to a seated conference participant.

11. The speakerphone of claim 9, further comprising:
 a bass loudspeaker coupled to the process unit and contained in the housing, wherein the bass loudspeaker has a center line angle;
 wherein the loudspeaker and the plurality of loudspeakers are tweeter loudspeakers.

12. The speakerphone of claim 11, wherein the center line angle of the bass loudspeaker is between −90 degrees and 90 degrees from horizontal.

13. The speakerphone of claim 12, wherein the center line angle of the bass loudspeaker is −90 degrees from horizontal.

* * * * *